June 1, 1965  R. RAMILLON  3,186,253
PIVOTAL SYSTEM FOR LEVER ARMS
Filed Jan. 31, 1962  4 Sheets-Sheet 2

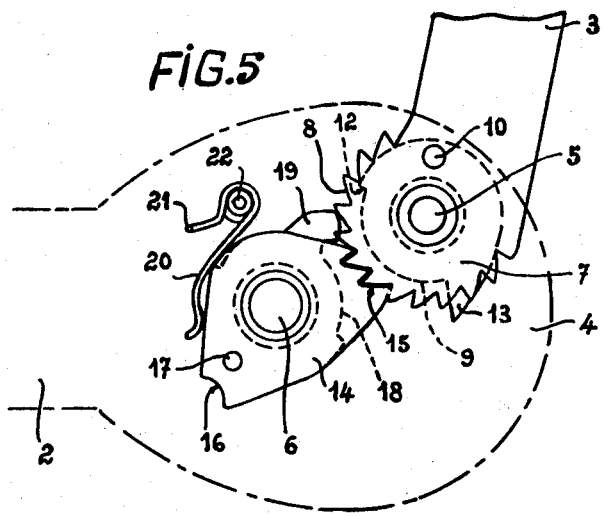
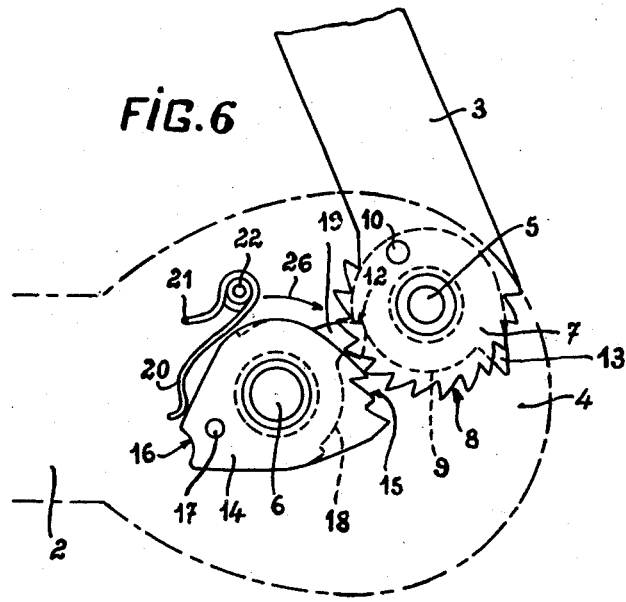

June 1, 1965  R. RAMILLON  3,186,253
PIVOTAL SYSTEM FOR LEVER ARMS
Filed Jan. 31, 1962  4 Sheets-Sheet 4
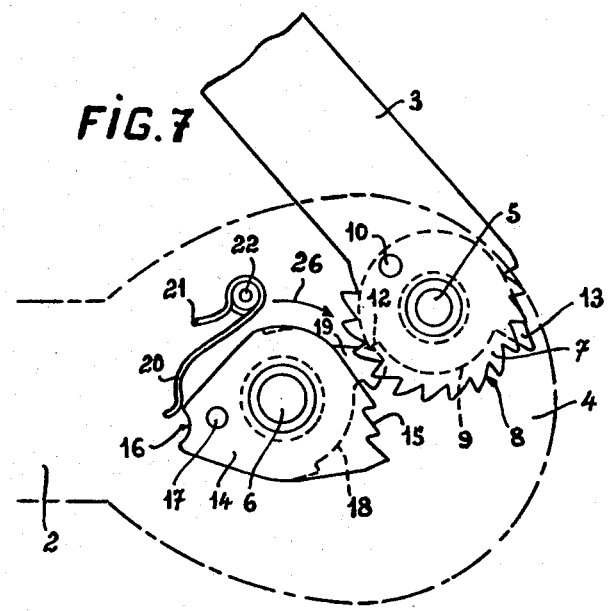
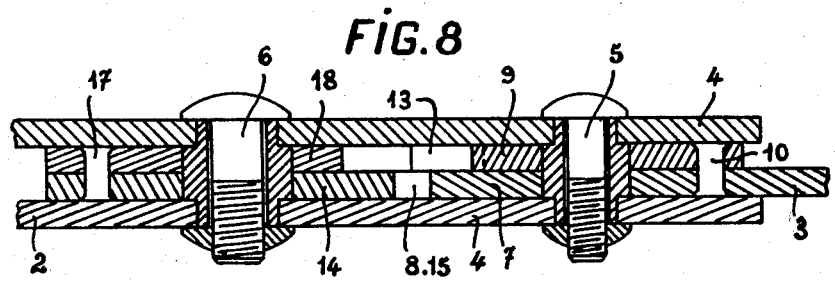

United States Patent Office 3,186,253
Patented June 1, 1965

3,186,253
PIVOTAL SYSTEM FOR LEVER ARMS
René Ramillon, 3 Rue Emile Zola, Grenoble, France
Filed Jan. 31, 1962, Ser. No. 170,209
Claims priority, application France, Feb. 15, 1961,
41,234, Patent 1,281,637
1 Claim. (Cl. 74—540)

My invention relates to a system adapted to secure in any relative angular position two lever arms which are pivotally interconnected, which system is suitable for various applications. Thus, the system is applicable to foldable seats and beds, since it allows obtaining very easily a plurality of relative positions between the components of such pieces of furniture. By way of example, in the particular case of a camp bed, said improved system is suitable for the pivotal connection between the levers defining the bed head. This forms only a particular application to which my improved system is by no means limited, my invention having chiefly for its object a pivotal system of which the applications are extremely varied.

To this end, one of the lever arms terminates with a strap in which are positioned two spindles, of which one ensures a free connection for the other arm which terminates with a head provided along a fraction of its periphery with a series of teeth arranged coaxially with the corresponding spindle, while a cam rigidly secured to said head is provided with at least two bosses, the other spindle carrying rigidly a pair of further cams, of which one is provided with a boss adapted to engage the bosses on the first-mentioned cam and the other cam is provided with a series of teeth adapted to engage the first series of teeth on the head with a boss engaged by a spring urging said two series of teeth into engagement and with a hollow section inside which said spring snaps when the two series of teeth are released with reference to each other upon engagement of the boss on the first cam with the cooperating boss associated with said other spindle.

Obviously, the various components forming part of said pivotal system may be executed in various manners. Thus, for instance, the head and the cam which are rigid with one of the levers may or may not be fitted at the end of said lever and they may or may not be constituted by a single part. Similarly, the strap terminating the other lever may be integral with the latter or be fitted thereon, and the two cams carried by the strap may or may not form a single part.

Furthermore, the strap rigid with one lever may carry three spindles, of which two are adapted to allow the relative pivotal movement of the two other levers terminating with heads as described hereinabove and extending in parallel spaced planes, while the third lever carries two pairs of cams, similar to the pair referred to hereinabove and adapted to cooperate with the corresponding lever heads in a manner such that it is possible to adjust the relative position of the three levers with reference to one another. Such an arrangement is particularly suitable for reclining arm-chairs in which it is necessary to provide for an adjustment in the relative position of the back and of the seat with reference to the legs of the chair.

My invention will be readily understood from the following description, reference being made to the accompanying diagrammatic drawing, illustrating, by way of example and by no means in a limiting sense, an embodiment of my improved pivotal system. In said drawing:

FIGS. 1 to 7 are plan views from above of a two-lever system shown in various successive positions, starting from its folded position.

FIG. 8 is a sectional view through line 8—8 of FIG. 4.

Figure 1:
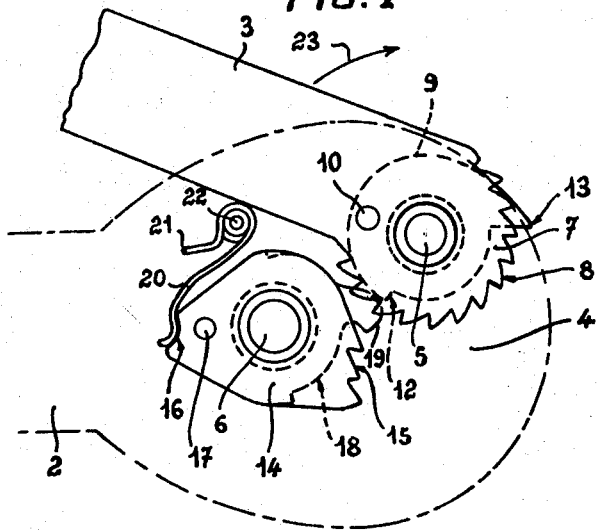

In the drawings, 2 and 3 designate two lever arms adapted to occupy various angular positions with reference to each other, in which positions they are secured against movement in at least one direction, to wit: the direction of opening of the angle formed by the two lever arms.

The lever arm 2 terminates in a housing 4 in which are accommodated two spindles, 5 and 6.

Around the spindle 5 is rotatably secured the head 7 of the lever arm 3; said head is provided along a fraction of its periphery with a series of sloping teeth arranged coaixially with the spindle 5. A cam 9 is rigidly secured to said head 7 by means of a stud 10. Said cam 9 is provided with two bosses illustrated respectively at 12 and 13, the boss 13 projecting clearly beyond the teeth 8, whereas the boss 12 occupies a receding position with reference to said teeth.

About the other spindle 6 is fitted a cam 14 provided with two bosses which are substantially in opposed diametrical relationship. One of said bosses is provided with a series of sloping teeth 15, while the other boss is provided with a recess 16. A stud 17 on the cam 14 makes said cam rigid with a second cam 18, which latter is provided with a boss 19 projecting clearly beyond the periphery of the cam 14. A hair pin-shaped spring 20 engages a stationary point 21 on the strap 4 and passes round a spindle 22 carried by the latter, so as to exert a constant pressure on the cam 14.

The operation and use of said pivotal connection between the two lever arms 2 and 3 is as follows:

For the position illustrated in FIG. 1, the two lever arms 2 and 3 are in their folded position, the two series of teeth 8 and 15 being disengaged from one another, while the boss 12 on the cam 9 lies ahead of the boss 19 on the cam 18.

Figure 2:
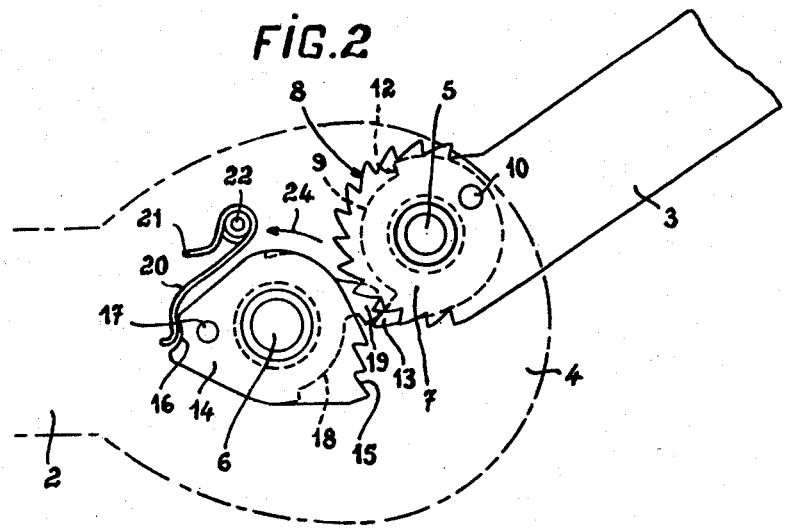

In order to shift the lever arm 3 into a predetermined angular position with reference to the lever arm 2, lever arm 3 is rotated in the direction of the arrow 23 (FIG. 1) until said lever arm 3 has reached the opposite end of its allowed stroke, as illustrated in FIG. 2. It should be noted that during said shifting of the lever arm 3 in the direction of the arrow 23, said lever arm 3 moves freely since the teeth 8 on its head 7 are disengaged from the teeth 15 on the cam 14, said teeth 15 having receded transversely by reason of the position assumed by the cam 14, in which position the latter is retained by reason of the thrust of the spring 20 against the bottom of the recess 16 in said cam 14.

However, when the lever arm 3 reaches the end of its movement in the direction of the arrow 23 shown in FIG. 1, that is when it has reached the position illustrated in FIG. 2, the boss 13 on the cam 9 rigid with the head of the lever arm 3 engages the boss 19 on the cam 18 which is rigid with the cam 14. Upon continued movement of the lever arm 3 in the direction of the arrow 23, the boss 19 is driven by the boss 13 thereby rotating the cam 14 in the direction of the arrow 24 of FIG. 2, until the teeth 8 and 15 engage and lock each other. During said last angular movement of the cams 14 and 18 in the direction of the arrow 24 of FIG. 2, the spring 20 moves out the recess 16 in the the cam 14 and engages the lateral surface of the boss on said cam. The system occupies then the position illustrated in FIG. 3, for which the teeth 8–15 engage each other.

Figure 3:
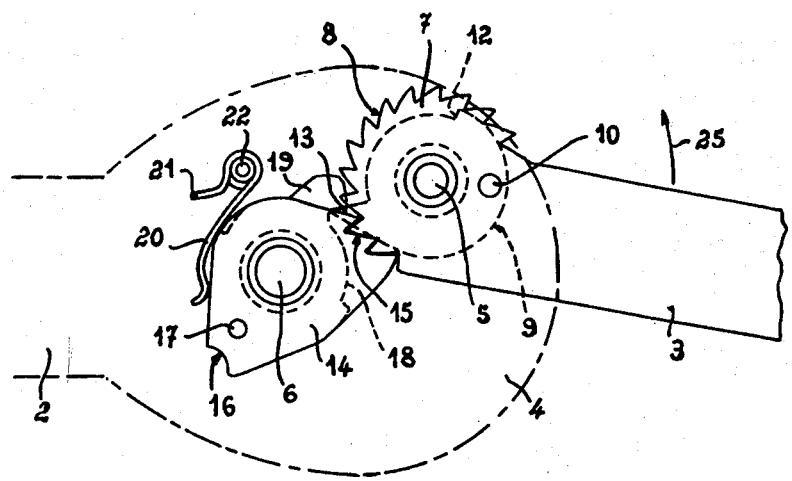
Figure 4:
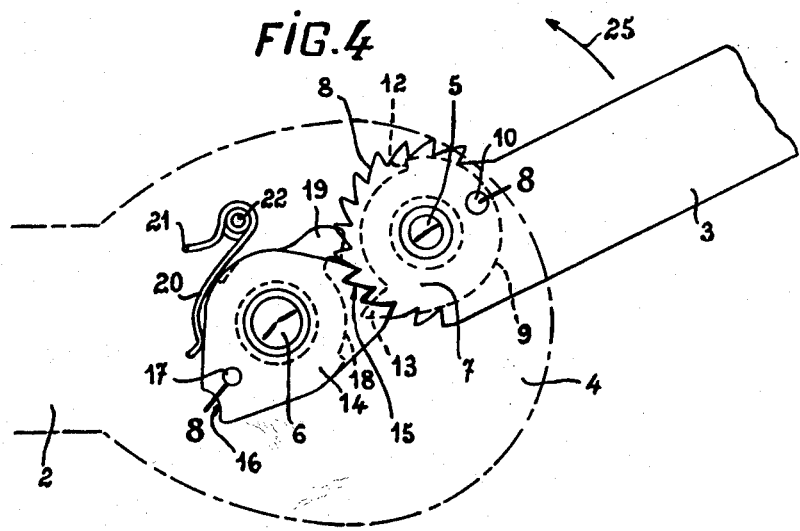

In order to set the two lever arms 2 and 3 in the desired angular position, it is then sufficient to urge the lever arm 3 in the opposite direction, that is: in the direction of the arrow 25 in FIGS. 3 and 4. During said movement, the teeth 8 and 15 remain engaged with each other, and the cams 14 and 18 undergo a stepwise rotary movement around the spindles 6 and 5 respectively. By way of example, there is illustrated in FIGS. 3 and 4 two relative secured positions for the lever arms. There exist however other possible secured positions for the lever arm 3 with reference to the lever arm 2.

If the angular movement of the lever arm 3 is continued in the direction of the arrow 25 beyond the last position for which the lever arm has been set for use with reference to the arm 2, the boss 12 on the cam 9 engages the boss 19 on the cam 18 and this results in a drive of the cams 14 and 18 by the cam 9 as illustrated in FIGS. 6 and 7. During this movement of the cams 14 and 18 in the direction of the arrow 26 in FIGS. 6 and 7, the end of the spring 20 slides over the cam 14 and this movement continues until the boss 12 on the cam 9 leaves the boss 19 on the cam 18, at which moment the end of the spring 20 drops into the recess 16 in the cam 14. The cams 14 and 18 are then held in secured position again by the spring 20 and the lever arm 3 is now free to move freely around the spindle 5. It is for this position of freedom that the lever arm 3 may be returned into its collapsed position illustrated in FIG. 1.

Obviously, my invention is by no means limited to the embodiment disclosed hereinabove, by way of example, and it covers, in contradistinction, all the modifications thereof falling within the scope of the accompanying claim.

What I claim is:

A pivotal system interconnecting two levers for securing said levers in any relative angular position within a predetermined range, said system comprising a housing rigid with one of the levers, two short spindles secured to the housing, a terminal head rigid with the other of the levers, and rotatably supported on a respective one of said spindles and including along its periphery an arcuate series of sloping teeth coaxial with the corresponding spindle, at least one pair of shorter and longer projections on said head of the other of the levers lying in a plane perpendicular to the respective spindle and spaced from the plane of said series of teeth and extending radially respectively short of the teeth at a point near one end of the arcuate series of teeth and beyond the teeth at a point near the other end of said series of teeth, a cam structure pivotally supported on the other of said spindles for angular movement about an axis, said cam structure including an arcuate series of teeth extending coaxially with respect to the said axis and adapted to mesh with the first-mentioned arcuate series of teeth on the other of the levers for a predetermined angular range of positions of said structure, a boss rigid with the cam structure lying in the plane of the projections on the head to one side of the series of teeth on said structure and adapted to be engaged selectively by said projections at the end of the angular displacement of the other of the levers and of the head carried therewith to be displaced through an angular path corresponding to the extent of the arcuate series of teeth, a recessed extension on said cam structure, a spring secured to the housing normally engaged with the recessed extension to hold the same in a position for which the boss registers with the arcuate series of teeth on the head and the series of teeth on the cam structure lies outside said path of said arcuate series of teeth on the head, the longer projection on the head engaging said boss upon angular movement of the levers carrying the head in a predetermined direction to angularly shift the cam structure about said axis and disengage the spring from the recessed extension while the series of teeth on the head are brought into mesh with the series of teeth on the cam structure, the shorter projection on the head engaging said boss upon angular movement of the last-mentioned lever in the opposite direction to urge the cam structure back into the spring-engaged position thereof and thereby disengage the two series of teeth.

References Cited by the Examiner

UNITED STATES PATENTS

| 2,120,156 | 6/38 | Simpson | 297—356 X |
| 2,784,770 | 3/57 | Herr | 297—367 |
| 2,911,245 | 11/59 | Kurz | 297—369 |

FOREIGN PATENTS

| 813,672 | 3/37 | France. |
| 132,934 | 7/00 | Germany. |

BROUGHTON G. DURHAM, *Primary Examiner.*

JACOB L. NACKENOFF, *Examiner.*